(12) United States Patent
Fernandez

(10) Patent No.: US 12,600,669 B2
(45) Date of Patent: Apr. 14, 2026

(54) SELF-HEALING POLYMER-MODIFIED CEMENTS FOR AMBIENT TEMPERATURE APPLICATIONS

(71) Applicant: BATTELLE MEMORIAL INSTITUTE, Richland, WA (US)

(72) Inventor: Carlos A. Fernandez, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 795 days.

(21) Appl. No.: 17/955,030

(22) Filed: Sep. 28, 2022

(65) Prior Publication Data

US 2023/0109371 A1 Apr. 6, 2023

Related U.S. Application Data

(60) Provisional application No. 63/279,777, filed on Nov. 16, 2021, provisional application No. 63/251,136, filed on Oct. 1, 2021.

(51) Int. Cl.

| | |
|---|---|
| *C04B 24/26* | (2006.01) |
| *C04B 24/00* | (2006.01) |
| *C04B 24/06* | (2006.01) |
| *C04B 24/42* | (2006.01) |
| *C04B 26/20* | (2006.01) |
| *C04B 103/00* | (2006.01) |

(52) U.S. Cl.

CPC ........ *C04B 24/2652* (2013.01); *C04B 24/006* (2013.01); *C04B 24/06* (2013.01); *C04B 24/42* (2013.01); *C04B 26/20* (2013.01); *C04B 2103/0046* (2013.01)

(58) Field of Classification Search

CPC ... C04B 24/2652; C04B 24/006; C04B 24/06; C04B 24/42; C04B 26/20

See application file for complete search history.

(56) References Cited

FOREIGN PATENT DOCUMENTS

| | | | | | |
|---|---|---|---|---|---|
| CN | 107970868 A | * | 5/2018 | .............. | B01J 13/20 |
| CN | 111908860 A | * | 11/2020 | .............. | C04B 28/04 |
| CN | 112710519 A | * | 4/2021 | ............... | G01N 1/28 |

OTHER PUBLICATIONS

English machine translation of CN 112710519A. (Year: 2021).*
English machine translation of CN 107970868A (Year: 2018).*
English machine translation of CN 11908860A. (Year: 2020).*
Vafaei, Babak Properties and Self-Healing of Cementitious Materials-Hydrogel System. May 2021. (Year: 2021).*

* cited by examiner

*Primary Examiner* — John E Uselding
(74) *Attorney, Agent, or Firm* — Derek H. Maughan

(57) ABSTRACT

Examples of new polymer-modified cement formulations with self-healing capability at ambient temperature are described. These polymer-modified cements can be readily mixed with typical fine and coarse aggregates to build new concrete structures. One example of such a formulation includes a concrete comprising a MBA-BDA polymer having bond forming chemical functionality configured to form a bonding matrix between the polymer and at least one component of the concrete at a temperature less than 50 degrees C. wherein the matrix obtains at least 70% recovery of compressive strength after a damage event.

7 Claims, 3 Drawing Sheets

Boric acid Gel formula

FIG. 1

MDA-BORIC ACID Co-polymer B

FIG. 2

Synthesis and structure of N, N-methylene-bis-acrylamide (MBA), and 1,4-butanediamine (BDA) copolymer

FIG. 3

SELF-HEALING POLYMER-MODIFIED CEMENTS FOR AMBIENT TEMPERATURE APPLICATIONS

CLAIM TO PRIORITY

This application claims priority from U.S. provisional patent application No. 63/251,136 filed Oct. 1,2021 as well as U.S. provisional patent application No. 63/279,777 filed Nov. 16, 2021. The contents of each are hereby incorporated by reference in their entirety.

FEDERALLY-SPONSORED RESEARCH AND DEVELOPMENT

This invention was made with Government support under Contract DE-AC0576RL01830 awarded by the U.S. Department of Energy. The Government has certain rights in the invention.

FIELD OF THE INVENTION

This disclosure relates to cement composites and compositions for uses in various applications including underground, underwater and unique environments.

BACKGROUND OF THE INVENTION

Cracking of concrete is a significant problem, with a price tag of $18-21 billion annually to repair concrete structures. It has been reported that the United States needs an estimated $3 trillion over a five-year period to improve the overall quality of its infrastructure. The current state-of-the-art in self-repairing cement and concrete materials involves one-time self-repairing polymer-cements in which capsules of polymer precursors are distributed in the cement and concrete matrix upon curing. The presence of a crack triggers the breaking of the capsules, precursors reacting and filling the crack. However, reactions are irreversible not allowing multiple repairing events.

Calcium carbonate formation as a side effect of microbiological activity has been exploited to trigger the self-healing capacity of concrete. These reactions are slow (5 weeks), and the presence of the bacteria, with specific temperature and oxygen requirements, affects mechanical properties leading to reduced compressive strength and tensile strength. While other embodiments and solutions have been envisioned, one of the major challenges has been the identification or creation of polymers that sustain harsh conditions, such as a very basic environment inherent of cement materials (pH>11), and self-heal at ambient temperatures, or that can bring about self-healing properties to cement and concrete. This is especially difficult because usually the trigger for polymer self-healing is heat, but these may not always be feasible in applications where this self-healing is strength is needed most such as down-hole bore applications or other deployments where raising the temperature of the concrete by application of external triggers such as heat can be difficult, costly, cumbersome or even taught away from.

The present disclosure provides examples, systems, methods and materials that address these concerns and provide examples of self-healing concretes that have low temperature reversible bonding that allow for self-repairing at temperatures significantly lower than other examples known in the prior art.

Additional advantages and novel features of the present disclosure will be set forth as follows and will be readily apparent from the descriptions and demonstrations set forth herein. Accordingly, the following descriptions of the present disclosure should be seen as illustrative of the disclosure and not as limiting in any way.

SUMMARY OF THE INVENTION

The present disclosure provides examples of new polymer-modified cement formulations with self-healing capability at ambient temperature. Utilization of this technology will lower the cost and frequency of concrete infrastructure repairs and maintenance while increasing its lifespan. The present polymer-modified cements can be readily mixed with typical fine and coarse aggregates to build new concrete structures. It will also provide the technical basis to extend their application to more durable, cost-effective repair materials and methods for existing infrastructure.

In one embodiment, a self-healing cement is described wherein the self-healing concrete includes a polymer having bond forming chemical functionality configured to form bonds between the polymer and at least one component of the concrete at a temperature less than 50 degrees C. In some configurations the chemical functionality is a type such as hydrogen, thiol, alcohol, epoxide, carbonyl, amine, amide, carboxylic acid, boric acid, sulfonic acid, ether, ester that can form hydrogen bonding, thiol metathesis; thiolate exchange; epoxide ring opening; metal coordination; ionic coordination; Diels-Alder bonding; and combinations thereof.

One cement formulation that undergoes self-healing at ambient temperature, includes a mixture of a Portland type cement and a polymer. In one example the polymer is a N, N-methylene-bis-acrylamide (MBA)—1,4-butanediamine copolymer (MBA-BDA) at a concentration between 5-15%, preferably around 10%. This copolymer, when mixed with cement at 10 wt % based on cement plus pozzolanic material weight, attain a self-healing polymer-modified cement with compressive strength recovery of up to 193%. Other polymers that could be used include boric acid gel, also known as 3-Aminophenylboric acid, polymer-bound that, in concentration as low as 1.5 wt % based on cement mass, showed recovery of compressive strength of 82% after one damage/healing event at ambient temperature whereas the same formulation without the polymer in it showed recovery values of 7%. 3-aminophenylboric acid—modified cement formulations showed better workability in the first two hours than the same formulation in the absence of the polymer (results at the end). A low molecular weight poly(ethylene-co-methacrylic acid) EMAA-based or poly(ethylene-co-acrylic acid) and their respective sodium salts incorporated in dry cement mixtures at similar concentrations.

Other example polymers include polydimethylsiloxane terminated with urea, diethylenetriamine, and carboxylic and boric acids (an example is shown above for boric acid gel), hyperbranched organosilicon polymers, polyurethanes, and ternary polymeric complexes of branched poly(ethylenimine) (bPEI)/poly(acrylic acid) (PAA)/poly(ethylene oxide) (PEO) which self-heal at 25° C.

Since cracking can occur at either the cement matrix or at the interface cement-aggregate, best performance occurs when the polymer undergoes dynamic bonding-debonding with the cement grains and/or with the aggregates such that there is a bond exchange between polymer chains, polymer cement, and polymer-aggregates at all times. Non-hazardous polymers possessing bonding properties with cement and typical concrete aggregates will be first combined with waterproof Portland cement (e.g., Type IP, Type GU, or Type MH) followed by the addition of sand to produce a polymer-modified concrete.

In their finished form the resulting cements typically demonstrate the following characteristics: compressive strength above 2,500 psi after seven days of curing, Young modulus<$2\times10^6$ psi$^4$, self-healing defined by exhibiting at least 80% recovery of compressive strength after (minimum) one damage event, similar slurry consistency and density to conventional cement. Preferably the resulting cements and concretes utilize materials that make them very cost competitive in their respective applications.

The purpose of the foregoing abstract is to enable the United States Patent and Trademark Office and the public generally, especially scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

FIG. 1 shows a boric acid gel formula of one of materials used in these experiments.

FIG. 2 shows the structure of the MBA-BDA co-polymer material described in the detailed description.

Figure 3:
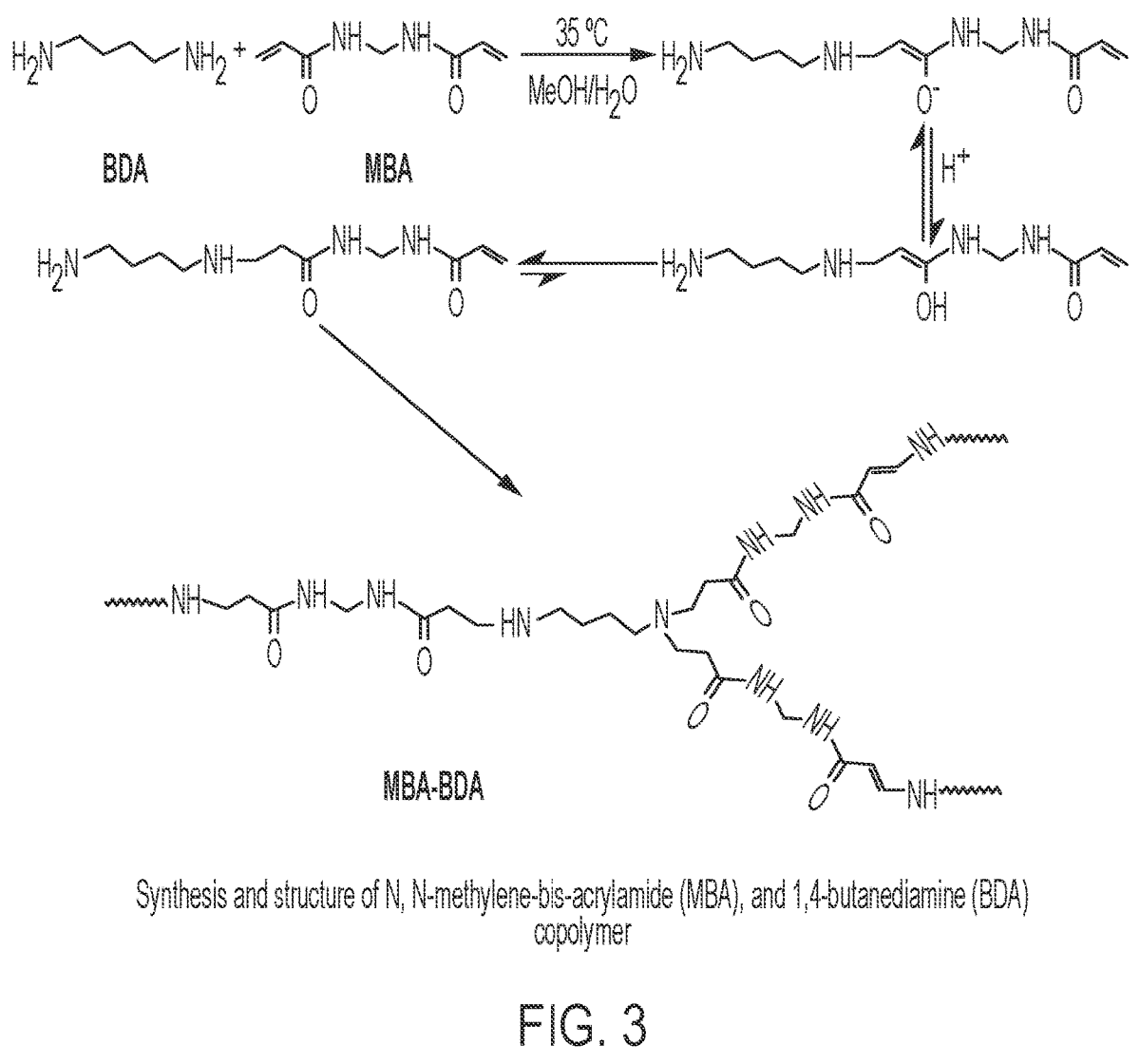

FIG. 3 shows the synthesis and structure of MBA-BDA co-polymer from N, N-methylene-bis-acrylamide (MBA), and 1,4-butanediamine (BDA)

DETAILED DESCRIPTION OF THE INVENTION

Figure 4A:
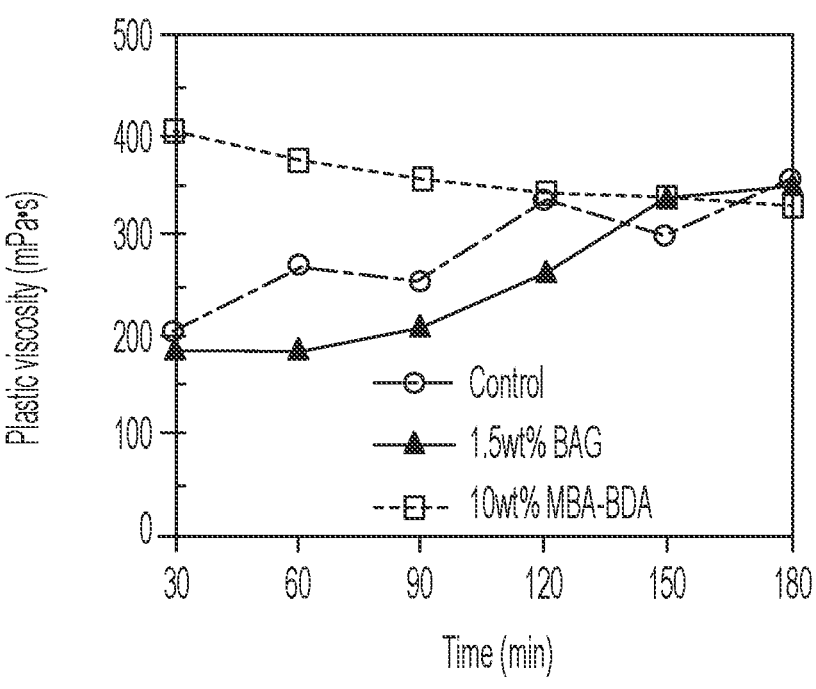
FIG. 4 (a) shows the plastic viscosity and FIG. 4(b) shows the yield stress of control plain cement, 1.5 wt % BA-cement, 10 wt % MBA-BDA cement
Figure 4B:
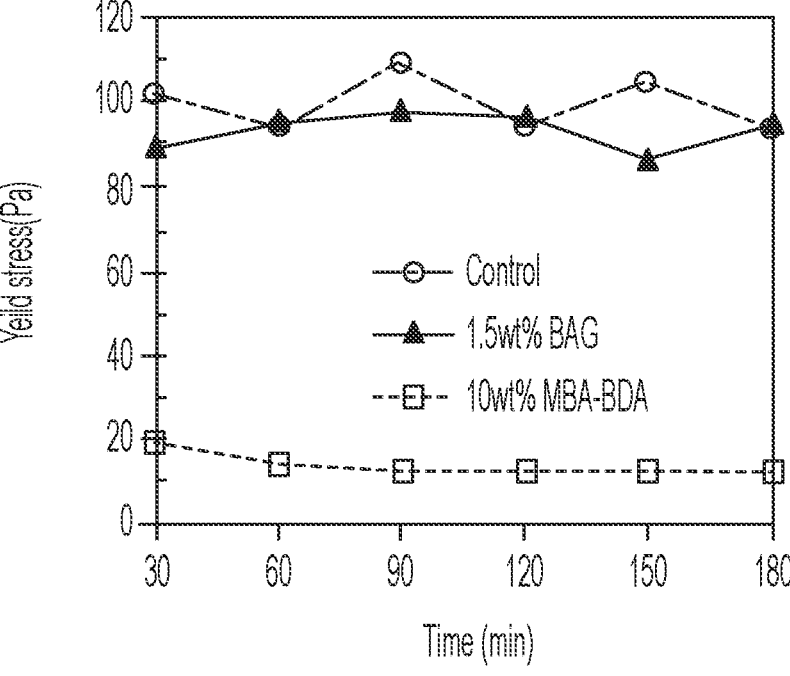

The following provides examples for specific cement polymer composites with enhanced physical properties and dynamic self repair capabilities. While various examples are described it should be understood that these descriptions are illustrative of exemplary embodiments and that invention is not intended to be limited to these specific examples. It will be clear that the invention is susceptible of various modifications and alternative constructions. Therefore, it should be understood that there is no intention to limit the invention to the specific forms disclosed, but, on the contrary, the invention is intended to cover all modifications, alternative constructions, and equivalents falling within the spirit and scope of the invention as defined in the claims While others including the present inventors of this application have developed a number of configurations for self-healing cement, low-temperature room temperature healing is particularly challenging due to the low mobility of polymers and lack of driving force for healing such as temperature gradient. In many instances, the mechanism responsible for self-healing is the reversible and dynamic chemical bond interactions between cement and polymer functionalities triggered by heat.

In the present disclosure we present self-healing polymer-modified cement formulations with self-healing capability at ambient temperature and that are capable of sustaining harsh conditions, such as very basic environments inherent of cement materials (pH>11). Each of the example polymers were combined with cement using similar (to conventional cement) water-to-cement ratios (w/c) and a typical pozzolanic material, silica flour. These polymers are (1) boric acid gel (BA) and (2) a copolymer named MBA-BDA which is synthesized through copolymerization by N, N-methylene-bis-acrylamide (MBA) and 1,4-butanediamine (BDA) (MBA-BDA) using 1:1 molar ratio.

Figures 1, 2:
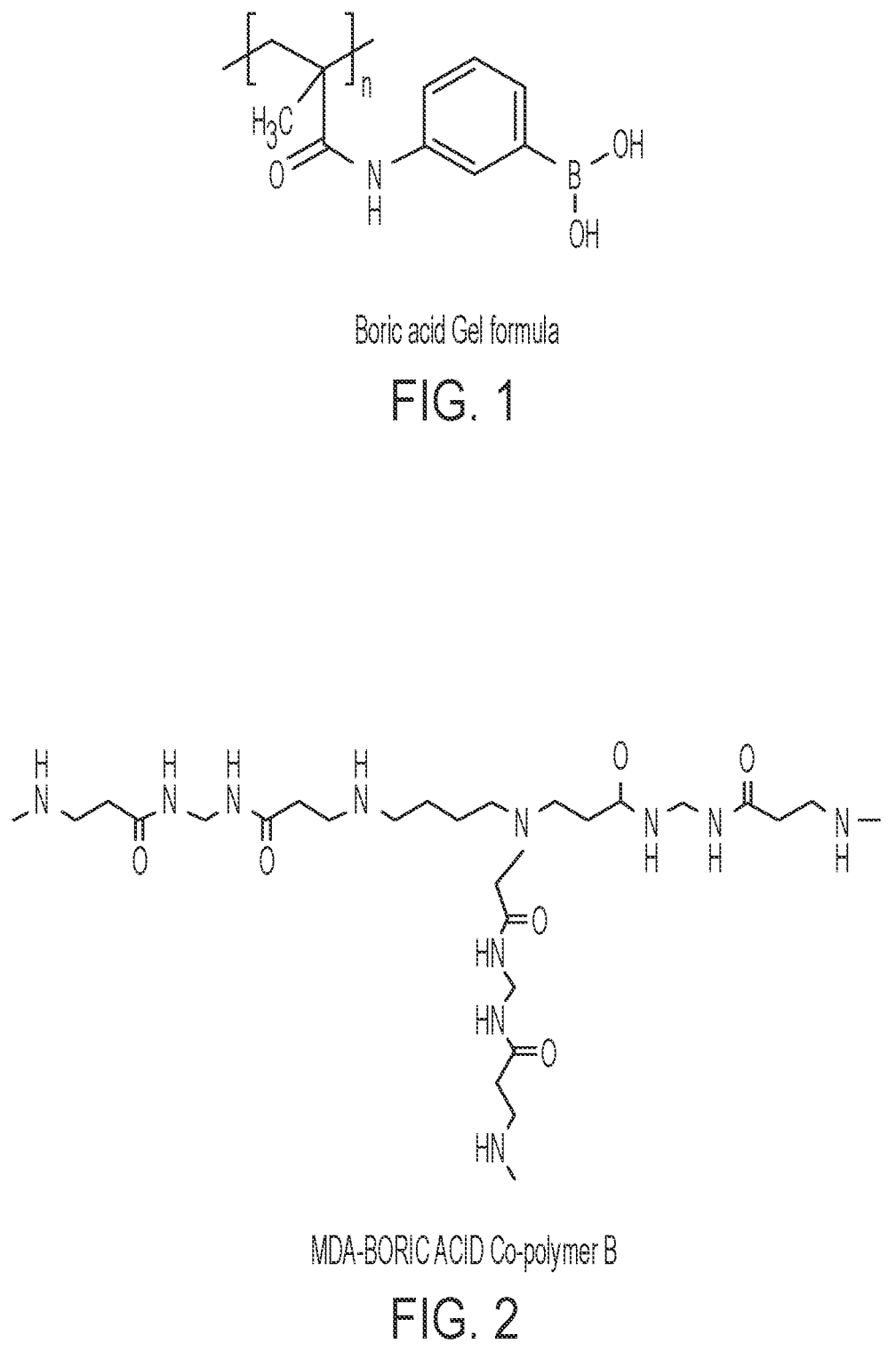

The structure of boric acid gel is shown in FIG. 1, and contains acidic moieties (e.g., boric acid), that can become deprotonated or form borate salts in presence of base such as calcium hydroxide. MBA-BDA copolymer (shown in FIG. 2) contains NH groups that can form multiple and reversible hydrogen bonds with the oxygen of the silicates and aluminates of cement and/or with the oxygen of silicon, calcium, magnesium, and iron salts and oxides found in typical concrete aggregates. Also, the borate can coordinate calcium, magnesium and iron from cement.

A low molecular weight poly(ethylene-co-metharcrylic acid) EMAA-based polymers; and combinations thereof when incorporated in dry cement mixtures at similar concentrations also can be effective. Other example polymers include polydimethysiloxane terminated with urea, diethylenetriamine, and carboxylic and boric acids (an example is shown above for boric acid gel), hyperbranched organosilicon polymers, polyurethanes, and ternary polymeric complexes of branched poly(ethylenimine) (bPEI)/poly(acrylic acid) (PAA)/poly(ethylene oxide) (PEO) which self-heal at 25° C.

The self-repairing process can involve various types of bonding and coordination including hydrogen bonding, thiol metathesis; thiolate exchange; epoxide ring opening; metal coordination; ionic coordination; Diels-Alder bonding and other types. The following exemplary description provides additional information related to various exemplary embodiments of materials and cements and the results of testing connected therewith.

BA (boric acid gel) was purchased from Aldrich (0.1-0.4 mm particle size, unknown molecular weight; CAS No 41685-84-1). Three batches of cement samples were prepared: a control batch without polymers, one containing 1.5 wt % BA polymer (with respect to cement mass), and one with 10 wt % MBA-BDA polymer. MBA-BDA copolymer was synthesized via Aza-Michael addition following reported protocols$^{14}$ at 35° C. for 24 hours in the presence of MeOH/H$_2$O. Then, acetone was added to precipitate the copolymer product. The solvent was removed, and the MBA-BDA polymer was rinsed with acetone five times followed by drying the sample under vacuum at 50° C. for 48 hours. The final product is a glassy polymer and can be made into powder via high-speed milling Type I/II cement and silica flour were first mixed manually to generate a homogenous powder.

To generate cement-polymer mixtures, 4.5 g of BA polymer or 30 g of MBA-BDA copolymer were added to the cement-silica flour powder mix. Then the polymer powder mix was gradually added to water at a mixing speed with 300 RPM in 2 mins. The cement slurry was mixed for another 13 min at the speed of 800 RPM. Typical components for making the cement samples are shown in Table 1. Standard cement consisting of 70 wt % class H cement, 30 wt % silica flour, and a water-to-cement weight ratio (w:c) of 0.54 was used as a control sample.

TABLE 1

| Cement and polymer synthesis amounts | | | |
|---|---|---|---|
| | Control cement | Cement + BA | Cement + MBA-BDA |
| Cement (g) | 210 | 210 | 210 |
| Silica flour (g) | 90 | 90 | 90 |
| Water (g) | 113.4 | 113.4 | 113.4 |
| Polymer (g) | 0 | 4.5 | 30 |

The rheological properties of the samples were analyzed with an Anton Paar MCR 301 rheometer. Rheological measurements were performed as a function of time at 22° C. to observe the time-evolving rheological properties of the samples that are indicative of ongoing reactions (i.e., polymerization and cement hydration). All sample mixtures were subjected to rheology measurements up to 180 minutes in the range of 0-800 $sec^{-1}$ of the shear rate under the torque operation limit (200 mN·m). During each run the shear rate was constantly increased from 0 to 800 $sec^{-1}$ and then reduced from 800 to 0 $sec^{-1}$ the same rate. Since cement slurry typically shows non-Newtonian behavior, undisturbed and dynamic yield stresses (instead of viscosity for Newtonian behavior) were obtained from the upward (i.e., increasing shear rates) and downward (i.e., decreasing shear rates) runs respectively.

By applying a Bingham plastic model, the maximum stress in the upward run was used to obtain the undisturbed yield stress, whereas using the intercept value at the stress axis in the downward run, the dynamic yield stress was obtained. The undisturbed yield stress can be considered as maximum stress to be imposed to initiate a flow of slurry from a stationary state while the dynamic yield stress can be interpreted as a stress that must be imposed to sustain a flow of the slurry.

Compressive strength samples consisted of cement columns with a diameter of 1" and a height of 4". For the compressive strength evaluation, a series of replicate tests were conducted on samples prepared with identical water to cement (w:c) ratio. The control (no polymer added) samples are denoted as $C_{s0}$. The compressive strength was measured in two stages. First a vertical loading displacement was applied at a rate of 0.001"/sec until the load reached 300 lbf. Then, the loading displacement rate was changed to 0.0001"/sec until a 10% load reduction was observed. The second stage of low loading displacement rate was applied to ensure the cement's structural integrity was not irreversibly affected. In this process, only microfractures formed as indicated by the strength decline. The maximum compressive load recorded was used to calculate the compressive strength. Each test was conducted on a minimum of three samples.

After the initial compressive strength test, the sample was aged at room temperature (22° C.) for at least one week under 100% relative humidity and then the compressive strength of the cement sample was measured again. This aging and compressive strength test cycle was repeated every week for several weeks. The compressive strength at a specific round of measurement is denoted as $C_{si}$. The ratio $C_{si}/C_{s(i-1)}$ is the recovered ratio of compressive strength.

TABLE 2

| Recovery test of compressive strength | | | |
|---|---|---|---|
| Samples | $C_{s0}$(psi) | $C_{s1}$(psi) | $C_{s0}/C_{s1}$ |
| Control | 3109 | 225 | 7.2% |
| Control + 1.5 wt % BAG | 5405 | 4458 | 82.5% |

In testing of the self-healing process of MBA-BDA polymer at room temperature. A polymer plate was made with MBA-BDA powder was heated to 100° C. and then pressed against a round plate and cooled down to room temperature. At room temperature, the broken polymer plate demonstrated that it could "self-heal" multiple times. This same MBA-BDA copolymer in the form of a powder was added to the cement slurry in a concentration of 10 wt % based on dry cement. The copolymer-modified cement slurry was then transferred to a cylindrical mold and cured for 24 hours. Then, the cylinder was mechanically split into two pieces followed by holding together the two pieces with the assistance of a rubber band to improve physical contact. The cement sample was demonstrated to heal itself at room temperature visible by the two pieces "glued" together after 24 hours.

To quantify the self-healing capability of polymer-modified cement and how it compares to unmodified cement, compressive strength analysis of original (un-damaged) cement samples and the same samples after damage followed by an aging (healing) event was performed with (minimum) three samples per formulation. After the compressive strength test, the samples were aged for a week to allow for regeneration of the microstructure before performing a new compressive strength test. The compressive strength tests were performed in two stages, applying fast load increments (vertical load displacement of 0.001"/sec up to 300 lbs) followed by a slow (vertical load displacement of 0.0001"/sec) to generate micro-fractures while preventing irreversible damage of the cement's structural integrity. These damage (compressive strength test)/healing events (sample aging for a week) were repeated six times. Unmodified (control) cement indicate a continuous compressive strength decline, particularly after the fourth test.

In contrast, the MBA-BDA-modified cement samples show more consistent compressive strength values across all six tests and the resulting recovery ratios seem to indicate that the cement increases its healing capability over time (tests 1 to 3 and tests 4 to 6) with recovery increasing from 48% to 193% and from 59% to 177%, respectively. The reason for a drop in compressive strength recovery ratio between the third and fourth test is unclear but could be due to a significantly higher damage post third test where instead of the controlled formation of microfractures, larger fractures were produced. However, the increase in recovery of mechanical strength after the fourth test seems to indicate that the self-healing capability combined with longer hydration times are responsible for the increase in recovery ratio. A recovery ratio higher than 100% suggests that the recovery of mechanical strength is a combination of both, the continued hydration of the cement sample (autogenous healing) and the self-healing process (autonomous healing). This is not the case for control cement due to the absence of autonomous healing.

The rheological properties of cement slurries ensure that the cement is workable during the application process. The rheological characteristics of a standard cement consisting of 70 wt % class H cement, 30 wt % silica flour, and a water-to-cement weight ratio (w:c) of 0.54 (control sample) were determined followed by the evaluation of BA-modified cement and MBA-BDA-modified cement. The rheology test of the cement slurry with 1.5 wt % BA shows lower plastic viscosity (better workability) than plain control cement samples in the first two hours of hydration and similar plastic viscosity thereafter.

Ten wt % MBA-BDA-modified cement showed a unique plastic viscosity development history in the first 3 h of hydration. The plastic viscosity decreases as a function of time with a higher value than plain cement but a lower value after three hours of hydration. As time evolves MBA-BDA polymer slowly dissolves in the cement slurry with the resulting adsorption of polymer moieties on the surface of cement particles (via hydrogen bonding between—NH functionalities in the polymer and oxygen atoms in the unhydrated cement grains as well as at the Calcium Silicate Hydrate (C—S—H) hydration products. In this fashion, the cement hydration process is gradually delayed with a resulting reduction in viscosity of the three-dimensional C—S—H hydration gel system. Unexpectedly, the yield stress of the MBA-BDA cement is about one order of magnitude lower than that of control unmodified) cement and BA-modified cement samples. This indicates that MBA-BDA cement (in the first three hours of hydration) behaves closer to a Newtonian fluid which makes it easier to pump especially under low shear rate conditions.

To better understand the physical and chemical properties of these polymer-modified cements, including proposing potential mechanisms for self-healing behavior, we performed X-ray microtomography (XMT) with density contrast analysis, X-ray diffraction (XRD) spectroscopy, and $^{13}C$ NMR of control cement samples and polymer-modified cement samples. The copolymer-modified cement showed homogeneous distribution of the polymer in the cement matrix available for autonomous healing of cracks. The virtually completely overlapping XRD data for all three samples highlights their similar mineralogy. X-ray diffraction analysis indicated that the samples were composed of quartz ($SiO_2$, 033-1161), portlandite [$Ca(OH)_2$, 044-1481], and gypsum ($CaSO_4 \cdot 2H_2O$, 033-0311). The most prominent difference between the two patterns was in the relative intensities of the quartz reflections, attributed to some preferential orientation of durable quartz grains. The analysis also demonstrates that the cement signature is not altered by the addition of polymer.

MBA-BDA, when combined with cement, brings about self-healing capability to cement as shown by a compressive strength recovery of up to 174% even after six damaging events. A combination of self-healing capability and the anticipated continuous hydration process of the aging cement accounts for these results and when optimized could be even higher. NMR results suggests that at least one of the mechanism responsible for self-healing in the MBA-BDA-cement composites is the formation of multiple hydrogen bonds between the carbonyl of the polymer and the hydrogen of C—S—H products in cement. The MBA-BDA-modified cement with self-healing capability represents an excellent alternative to commercial cement with the potential to reduce costs associated to maintenance and repair of concrete infrastructure.

In another set of experiments, polyacrylic acid (PAA), polyethylene oxide (PEO) and branched polyethylenimine (bPEI) polymers were dissolved in water (113.4 mL) in a concentration of 2 mg/mL, 2 mg/mL, and 0.1 mg/mL, respectively and then mixed with 300 g of cement:silica flour 7:3 to make a slurry that, after 24 h solidified at ambient temperature. Concentration of polymer (465 mg) based on cement+silica flour is 0.15 wt %. A solid cylindrical sample of this dried concrete (1" diameter×4" long) was then bent producing a cut. This cut after 72 h is healed and resisted a mass of 2.8 lb. Another sample of the same composition was cured at 85 C and broken in two pieces, when then healed after 72 h at 85 C demonstrating that complexes cross-linked by both electrostatic and hydrogen-bonding interactions provided healing of the broken concrete. While this example is provided ranges of between 0.01 and 25 wt % based on cement+silica flour mass can be used and obtain similar results.

While various preferred embodiments of the disclosure are shown and described, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A self-healing concrete comprising:
a hyperbranched organosilicon polymer having bond forming chemical functionality configured to form bonds between the polymer and at least one component of the concrete at a temperature less than 50 degrees C.

2. The self-healing polymer concrete of claim 1 wherein the bond-forming chemical functionality is selected from the group consisting of hydrogen, thiol, alcohol, epoxide, carbonyl, amine, amide, carboxylic acid, boric acid, sulfonic acid, ether, ester, thiol metathesis; thiolate exchange; epoxide ring opening; metal coordination; ionic coordination; Diels-Alder bonding; and combinations thereof.

3. The self-healing polymer concrete of claim 1 where the polymer is MBABDA.

4. The self-healing polymer concrete of claim 1 wherein the polymer is branched bPEI/PAA/PEO.

5. The self-healing polymer concrete of claim 1 wherein the polymer is polydimethysiloxane terminated with urea.

6. The self-healing polymer concrete of claim 1 wherein the polymer has a ternary polymeric complex.

7. The self-healing polymer cement of claim 1 wherein the resulting self-healing concrete has a matrix with a compressive strength above 2,500 psi after seven days of curing.

* * * * *